B. ISOM.
HEADLIGHT FOR AUTOMOBILES.
APPLICATION FILED MAY 20, 1913.
1,102,409.
Patented July 7, 1914.
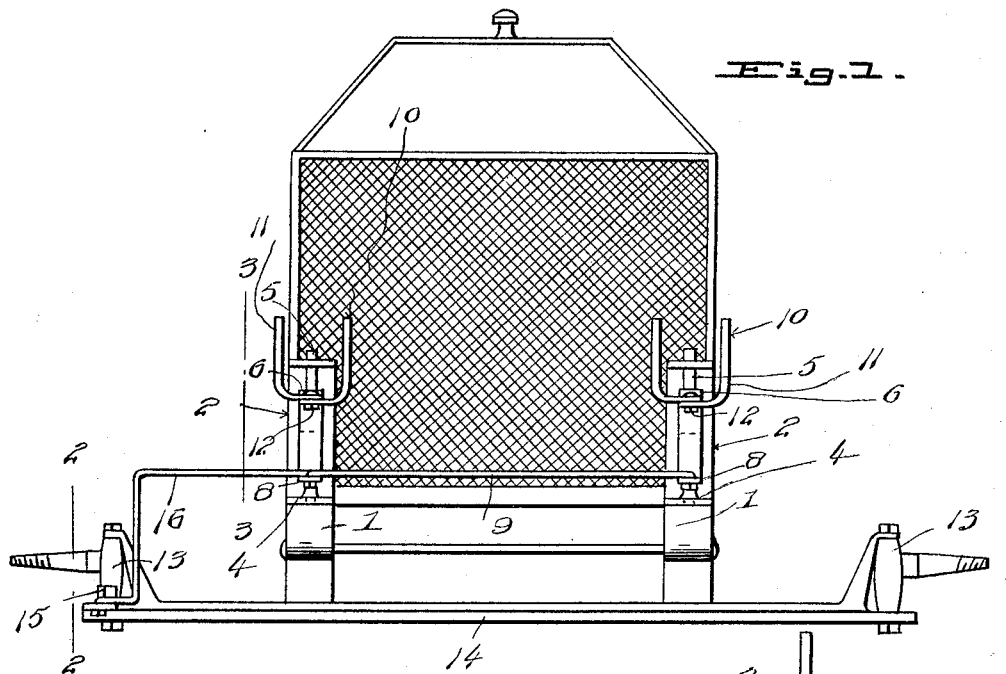
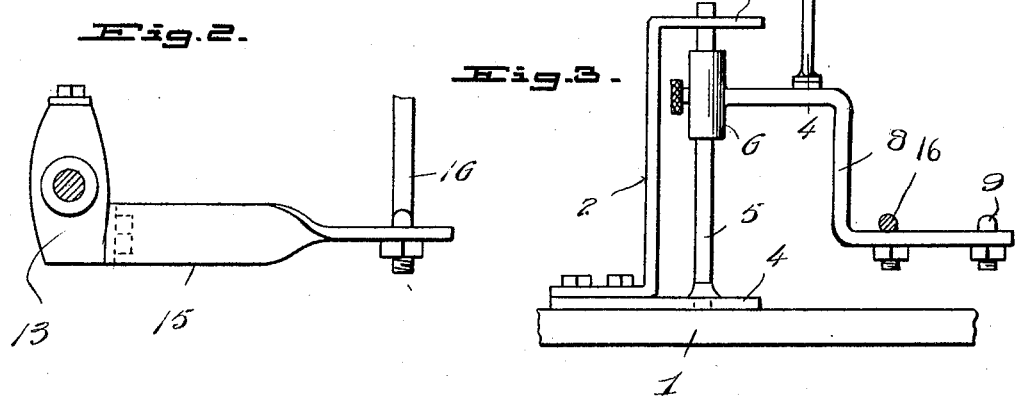
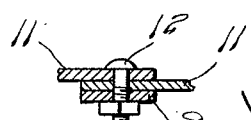
Witnesses
Inventor
B. Isom.
By
Attorney

UNITED STATES PATENT OFFICE.

BENNIE ISOM, OF CONCORD, NEBRASKA.

HEADLIGHT FOR AUTOMOBILES.

1,102,409.  Specification of Letters Patent. Patented July 7, 1914.

Application filed May 20, 1913. Serial No. 768,871.

*To all whom it may concern:*

Be it known that I, BENNIE ISOM, a citizen of the United States, residing at Concord, in the county of Dixon, State of Nebraska, have invented certain new and useful Improvements in Headlights for Automobiles; and I do hereby declare the following to be a full, clear, and exact description of the invention, such as will enable others skilled in the art to which it appertains to make and use the same.

The present invention is directed to improvements in headlights for automobiles, and has for its object to so construct the same that the rays of light will be projected along the line of travel of the machine.

A further object of the invention is to provide a device of this character constructed in such a manner that it can be readily applied to motor-vehicles of different sizes.

With these and other objects in view, this invention resides in the novel features of construction, formation, combination and arrangement of parts to be hereinafter more fully described, claimed, and illustrated in the accompanying drawing, in which:—

Figure 1 is a front view of an automobile equipped with the device. Fig. 2 is a sectional view on line 2—2 of Fig. 1. Fig. 3 is a similar view on line 3—3 of Fig. 1. Fig. 4 is a sectional view on line 4—4 of Fig. 3.

Referring to the drawing, the numeral 1 designates the spaced side bars of any well known automobile frame, and to which are bolted the brackets 2 having the upper and lower plates 3, 4, respectively, for rotatably supporting vertical shafts 5. Engaged upon the shafts 5 are collars 6, which are provided with set screws 7, whereby the same can be adjusted vertically upon said shafts and held in the desired adjusted positions. Formed integral with the collars 6 are arms 8 which are directed forwardly and have pivotally connected at their outer ends the opposite ends of the rod 9.

The head-light brackets 10 consist of curved arms 11, which have their ends arranged in overlapping relation and secured to the arms 8 by bolts 12, whereby said arms can be swung on an arc so that brackets can be used in connection with head-lights of various sizes.

Bolted to one of the steering knuckles 13 of the forward axle 14 is an arm 15, to the outer end of which is pivotally connected the lower end of the crank arm 16, the upper end of which being similarly connected to one of the arms 8, and at a point rearward of the pivotal connection between one end of the rod 9 and arm 8.

From the foregoing description it will be seen that when an automobile equipped with the device is deviating from a straight course, the consequent movement of the steering knuckle 13 will shift the arms 8 through the medium of the shaft 16 and rod 9, thus causing the brackets to swing to deflect the rays in the direction of travel of the machine, it being of course understood that head-lights of any well known construction are supported by the brackets 10. Further it will be noted that by providing the collars 6 the arms 8 can be adjusted to suit machines of different height, and that by adjustably connecting the lower ends of the arms of the brackets the same can be adjusted to support head-lights of various sizes.

What is claimed is:—

1. In a device of the class described, the combination with the side bars of an automobile frame, of brackets carried thereby, vertical shafts rotatably supported by the brackets, collars engageable upon said shafts, means carried by the collars for holding the same in different adjusted positions upon said shafts, arms formed integral with the collars, and lamp supporting brackets having their lower ends adjustably connected to the first named arms.

2. The combination with the frame of an automobile, of dirigible headlight supports each comprising an upstanding arm having the lower end secured to said frame and having the upper end formed with a lateral bearing, a shaft mounted to turn in said bearing and extending downward parallel with said arm, a collar slidable on said shaft, a set screw securing said collar in adjusted positions on said shaft, a crank arm integral with said collar, and lamp holding means carried by said crank arm.

In testimony whereof, I affix my signature, in the presence of two witnesses.

BENNIE ISOM.

Witnesses:
 FRANK CLOUGH,
 MARGARET A. NORDYKE.

Copies of this patent may be obtained for five cents each, by addressing the "Commissioner of Patents, Washington, D. C."